L. BACHRICH.
CONTROL OF VALVES, DETENTS, SWITCHES, AND THE LIKE.
APPLICATION FILED OCT. 13, 1908.
1,043,500.
Patented Nov. 5, 1912.
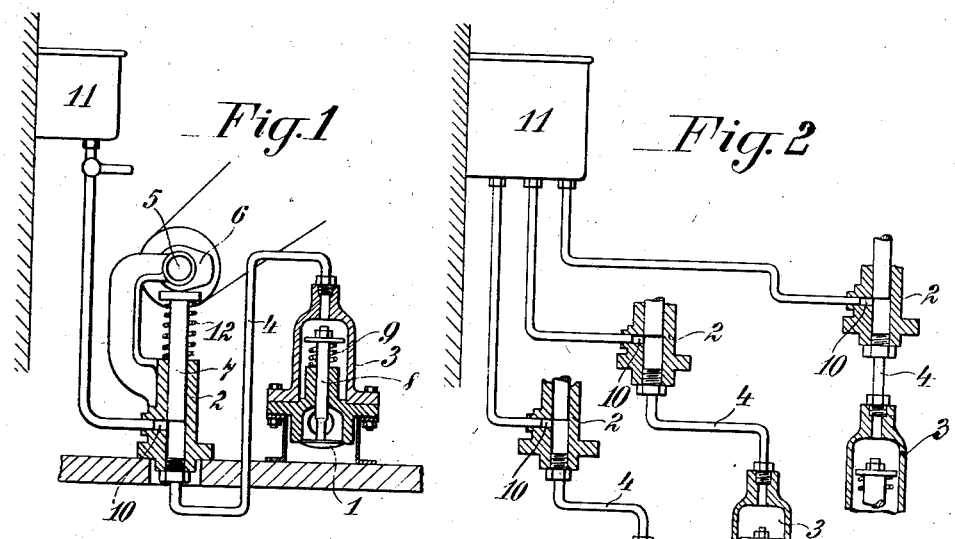
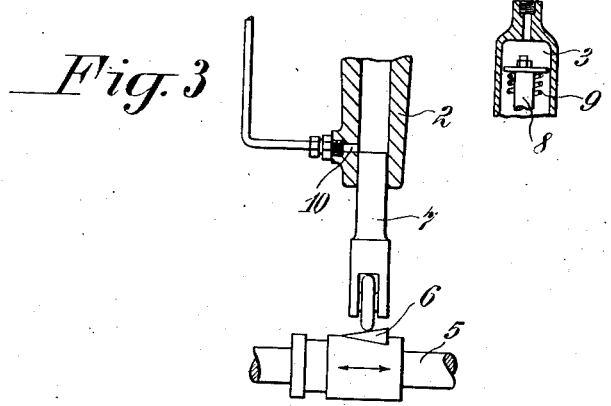
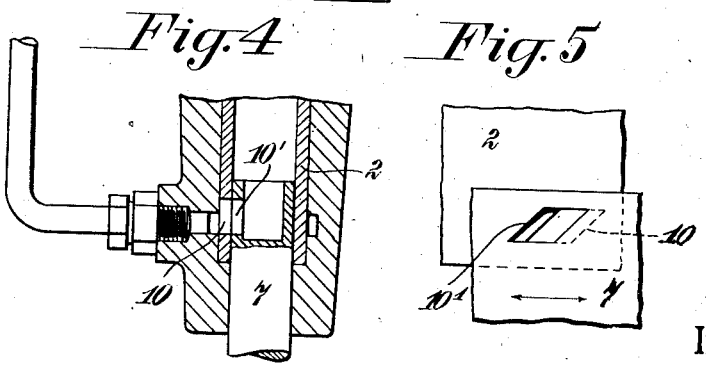
Witnesses.
Inventor.
Ludwig Bachrich

UNITED STATES PATENT OFFICE.

LUDWIG BACHRICH, OF VIENNA, AUSTRIA-HUNGARY.

CONTROL OF VALVES, DETENTS, SWITCHES, AND THE LIKE.

1,043,500.  Specification of Letters Patent.  Patented Nov. 5, 1912.

Application filed October 13, 1908. Serial No. 457,550.

*To all whom it may concern:*

Be it known that I, LUDWIG BACHRICH, a subject of the Emperor of Austria-Hungary, residing at Vienna, Austria-Hungary, have invented certain new and useful Improvements in the Control of Valves, Detents, Switches, and the Like; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The invention relates to a controlling device for valves, switches, detents, ignition devices and the like wherein there is inserted between the operated part and the part to be operated a duct or the equivalent thereof containing a liquid for transmitting the movement and operating as a hydraulic piston; this duct is connected with an equalizing chamber which during the operation of the control automatically equalizes any variation in the condition and quantity of the transmitting liquid either during or between each working period, so that the part to be controlled may be moved to an exact predescribed and predetermined extent from a distance. If the controlled part has a variable stroke, the equalizing chamber renders it possible correspondingly to lengthen or shorten the liquid connection.

In the accompanying drawings examples of the invention are illustrated.

Figure 1 shows the control of a valve in vertical section. Fig. 2 shows diagrammatically an arrangement of several such controls connected with a common equalizing chamber. Fig. 3 shows a device for governing the stroke of the controlled part. Fig. 4 shows a modification of this governing device, and Fig. 5 is a development of two coöperating parts of the device shown in Fig. 4.

In the arrangement shown in Fig. 1 for controlling a valve 1, a cylinder 2 is continuously connected by a pipe 4 with a cylindrical valve casing 3. In the system 2, 3, 4 is a suitable liquid which effects the transmission, forming a hydraulic piston. On the distributing shaft 5 there is an actuating member or cam 6 which, as the shaft rotates, periodically depresses a controlling member such as piston 7 in the cylinder 2.

The motion of this piston is transmitted by the liquid to a controlled member or piston 8 in the cylinder 3 which is connected with the member to be actuated as valve 1 and in this manner the pressure of spring 9 keeping valve 1 closed, is overcome. As the piston 7 under the action of cam 6 is positively moved inward in smooth running to an amount exactly corresponding with the curved form of the cam, the valve 1 performs a movement which, as regards the acceleration, length of stroke and duration, exactly corresponds with the form and motion of the cam. The movement of the valve is therefore in fact exactly controlled even if the cam is far removed from the valve. This positive control and a continuous working would however be impossible if care were not taken to maintain the normal condition in the system 2, 3, 4. A small variation in volume of the transmitting medium owing to leaks or to cooling or heating would suffice to derange the desired and predetermined motion of the valve. To prevent this a duct 10 connects the cylinder 2 with an equalizing chamber 11. This duct is so situated that the piston 7 before finishing its outward stroke produced by spring 12 uncovers the orifice of this duct in the cylinder. Thus whenever there is a variation from the normal condition either in the positive or the negative direction, when the piston 7 is in its upper position there is compensation by flow of liquid either from the reservoir to the system 2, 3, 4 or from the system to the reservoir, so that the normal condition is restored. According to this invention several such systems 2, 3, 4 can be served by one reservoir as shown in Fig. 2 and a single cam 6 can control several valves or the like.

By suitable selection of the ratio to each other of the cross sections of the driving piston 7 and the driven piston 8 and the corresponding strokes of the pistons, and also the ratio between the velocities which are imparted directly to the driving piston and indirectly through the transmitting liquid to the driven piston, low velocities can be obtained so that liquids, that is, practically incompressible transmitting media, can be used without danger of damaging the parts owing to concussions of liquid. It is possible for the constructor either to keep the original difference of pressure between the equalizing chamber or chambers and the rest of the system at zero, or to increase it to any degree by means of known devices such as accumulators or the like.

When a variable stroke is to be imparted to the valve 1 or other part which is to be affected by the governor of the engine, the distributing device becomes a governing device. In this case a variable stroke may be given to the valve 1 by making cam 6 of conical shape and mounting it so that it is adapted to be slid axially on the shaft by the governor (Fig. 3). The piston 7 will then move more or less over the orifice of duct 10, so that a greater or smaller stroke is imparted to valve 1.

Fig. 4 shows by way of example a construction wherein the slot forming the orifice of duct 10 is at an angle to the axis of cylinder 2. The piston 7 has a similarly inclined slot 10'. Thus accordingly as the piston is rotated in one direction or the other as it moves up and down, the longer or shorter will be the column of liquid contained in the system 2, 3, 4 which forms the hydraulic piston. In this manner it is possible to vary the stroke of valve 1.

Control by means of a slot and combined rectilinear and rotary reciprocation has already been used in steam engines, but the purpose and function of such devices is quite different from that described herein, since in the case of the steam engine the driving medium which acts on the working piston of the engine is sooner or later cut off, while in the present case the length of the hydraulic piston can be increased or decreased as desired, but when the stroke is the same, that is when the motor is running at constant load, the correct length of the hydraulic piston is maintained by the equalizing vessel. Suitable transmission liquids for the foregoing purpose are such as expand comparatively little when heated and have a low freezing point; for example, oil or glycerin may be used. However, an elastic fluid such as compressed air, gas or steam can be used, in which case the air tight equalizing chamber is kept at a constant pressure by insulating it thermally and by other known devices, this pressure being equal to the original pressure in the system 2, 3, 4. During or between each working period the pressure is equalized between the reservoir 11 and system 2, 3, 4 or vice versa accordingly as the pressure in 2, 3, 4 rises or sinks. The larger the reservoir in comparison with the total volume of 2, 3, 4 the more exact and satisfactory will be the equalization or the return of the pressure to its original value.

In all the foregoing cases any variations in the liquid between the driving and driven parts produced by variations in temperature, leaks, or other causes, are counteracted by the equalizing reservoir, that is, the normal condition is always restored, so that the part to be controlled always operates in the prescribed manner.

The method of control herein described can be used in all cases in which movable parts have to be arbitrarily or periodically operated as is the case for example with switching devices, lubricators and detents. The lubricating pumps of a locomotive cylinder for example can be operated from the foot plate by means of such controlling mechanism.

Having thus described the nature of my said invention and the best means I know of carrying the same into practical effect, I claim:—

1. A controlling device for operating parts by liquid transmission, comprising a controlling member, a controlled member, a liquid containing duct between said members, containing a liquid which is unchanged under all conditions of operation, an equalizing reservoir, a duct controlled by the controlling member connecting said reservoir with the first named duct.

2. A controlling device for operating parts by liquid transmission comprising a controlling member, a controlled member, a duct between the two members, a non-circulating quantity of liquid maintained between the members, an equalizing reservoir automatically and periodically connected to said duct to maintain the volume of liquid between the members substantially constant under all conditions of operation.

3. A controlling device for operating parts by liquid transmission, comprising a controlling member and a controlled member, a liquid containing duct between the members, an unchanged volume of liquid in said duct, an equalizing reservoir connected to said duct, the point of connection being controlled by the controlling member at the beginning of its movement, whereby the volume of liquid between the two members is maintained substantially constant under all conditions of operation.

4. A controlling device for operating parts by liquid transmission, comprising a reciprocating controlling member, a reciprocating controlled member, a duct between them, an unchanged volume of liquid in said duct, and means to automatically equalize the volume of liquid between the two members at each reciprocation thereof.

5. A controlling device for operating parts by liquid transmission, comprising an actuating device 6, a cylinder, a piston therein adapted to be moved by said actuating device, a second cylinder, a piston in the said cylinder, a controlled member connected to said piston, a liquid containing duct connecting the two cylinders, an unchanged volume of liquid in the said duct, and reciprocated therein by said pistons, an equalizing reservoir, and a duct controlled by the first named piston connecting the said reservoir with the first named cylinder.

6. A controlling device for operating parts by liquid transmission, comprising a controlling member, a controlled member, a liquid containing duct between said members, an unrenewed volume of liquid therein, an equalizing reservoir, a duct controlled by the controlling member connecting the said reservoir with the first named duct.

7. A controlling device for operating parts by liquid transmission, comprising an actuating member, a cylinder, a rotatable piston therein having an inclined slot and adapted to be moved by the said actuating member, a second cylinder, a piston in the latter, a controlled member connected with the last named piston and a liquid containing duct connecting the two cylinders, a liquid held in said duct between and reciprocated therein by said pistons, an equalizing reservoir, a duct controlled by the first named piston connecting the reservoir with the first named cylinder, said duct terminating in the latter in a slot inclined to the axis of the cylinder.

8. A device for the control of parts by a column of liquid, comprising a driving valveless piston, a driven valveless piston, a duct containing an unchanged volume of liquid forming the column between the casings of the driving piston and the driven piston, an equalizing reservoir periodically connected to the duct automatically for equalizing the slightest lengthenings or shortenings of the column, caused by variations in the state of the liquid.

In testimony that I claim the foregoing as my invention, I have signed my name in presence of two subscribing witnesses.

LUDWIG BACHRICH.

Witnesses:
    JOSEF RUBASCH,
    ROBERT W. HEINGARTNER.